United States Patent [19]

Evans

[11] Patent Number: 5,340,866
[45] Date of Patent: Aug. 23, 1994

[54] HEAT STABLE FLUOROSILICONE RUBBER COMPOSITIONS

[75] Inventor: Edwin R. Evans, Clifton Park, N.Y.

[73] Assignee: General Electric Company, Waterford, N.Y.

[21] Appl. No.: 80,997

[22] Filed: Jun. 21, 1993

Related U.S. Application Data

[63] Continuation of Ser. No. 721,024, Jun. 29, 1991, abandoned.

[51] Int. Cl.$^5$ ............................................. C08K 3/10
[52] U.S. Cl. .................................... 524/403; 524/431; 524/588
[58] Field of Search .................. 524/403, 431, 588

[56] References Cited

U.S. PATENT DOCUMENTS

| | | | |
|---|---|---|---|
| 4,108,825 | 8/1978 | Hayes | 524/403 |
| 4,110,300 | 8/1978 | Matsushita | 524/431 |
| 4,355,121 | 10/1982 | Evans | 523/213 |
| 4,366,278 | 12/1982 | Hamada et al. | 524/403 |
| 4,525,528 | 6/1985 | Bush et al. | 524/860 |
| 4,769,412 | 9/1988 | Inoue et al. | 524/431 |
| 4,952,617 | 8/1990 | Ayala et al. | 524/431 |
| 4,962,151 | 10/1990 | Mellon | 524/431 |

OTHER PUBLICATIONS

Japanese Abstract JP-A-3 039 361.

*Primary Examiner*—Melvyn I. Marquis
*Assistant Examiner*—Karen A. Dean

[57] ABSTRACT

A heat curable fluorosilicone rubber composition having improved heat stability without a sacrifice in physical properties is provided by using critical amounts of cerium hydroxide and red iron oxide in the preparation of the curable fluorosilicone composition.

15 Claims, No Drawings

HEAT STABLE FLUOROSILICONE RUBBER COMPOSITIONS

This is a continuation of copending application. Ser. No. 07/721,024 filed on Jun. 29, 1991. now abandoned.

BACKGROUND OF THE INVENTION

The present invention relates to fluorosilicone rubber compositions. More particularly, the present invention relates to additives which increase the heat stability of fluorosilicone rubber compositions.

Fluorosilicone rubbers are useful in the preparation of hoses, seals, gaskets, and linings for fuel tanks and for electrical insulation which is subjected to fuels, lubricating oils and hydraulic fluids. These applications require such rubbers to possess certain physical properties, such as high tear strength, high elongation, and low compression set. In addition to the foregoing properties, fluorosilicone rubber compositions used in the applications described above must also be heat stable.

Silicone rubbers are generally stable at temperatures below about 150° C. and may be used at temperatures up to about 260° C. and even up to 315° C. for short periods of time. However, at temperatures above about 200° C. for extended periods of time, silicone rubbers tend to deteriorate rapidly. Fluorosilicone rubbers are even less heat stable than their non-fluoro-containing silicone rubber analogs because the fluorosilicone rubbers are more susceptible to siloxane bond cleavage and oxidative degradation. Since fluorosilicone rubbers are generally used at elevated temperatures in many of their applications, deterioration at such temperatures is highly undesirable.

It is known in the art that amphoteric metal oxides and hydroxides inhibit the oxidation and decomposition of fluorosilicone rubber over the range of 250°–300° C. Reference is made, for example, to E. L. Warrick, et al., *Rubber Chemistry and Technology* 52,442–443 (1979).

U.S. Pat. No. 3,647,741 (Hutchison) discloses the use of fumed titanium dioxide to improve the heat stability and compression set of silicone elastomers.

U.S. Pat. No. 4,355,121 (Evans) teaches the use of a rare earth octoate as a heat stabilizer.

However, while amphoteric metal oxides and hydroxides provide a fluorosilicone rubber with adequate resistance to heat aging, such compounds adversely affect certain of the rubber's physical properties, e.g., hardness, elongation, and tear strength. With these compounds, the fluorosilicone rubber's Durometer hardness increases while the elongation and tear strength decrease.

It is desirable therefore to provide a method for improving the heat stability of a heat curable fluorosilicone rubber composition without sacrificing the physical properties of the rubber composition.

Such a method, as well as the improved heat curable fluorosilicone composition resulting therefrom, is provided by the present invention.

The present invention is based on the discovery that a combination of red iron oxide and cerium hydroxide, each in critical amounts, will enhance a fluorosilicone rubber's resistance to thermal aging at elevated temperatures, e.g., 200° C. and higher, without sacrificing the rubber's physical properties.

U.S. Pat. No. 4,525,528 to Bush et al. (Bush) discloses the use of iron oxide as a heat aging additive and the use of cerium hydroxide as a compression set resistance promoter in a fluorosilicone composition. However, the Bush patent does not teach that critical amounts of cerium hydroxide and iron oxide will increase the heat stability of a fluorosilicone composition.

The combination of red iron oxide and cerium hydroxide in critical amounts has a synergistic effect on the heat stability of the fluorosilicone rubber in that the combination of the two ingredients will provide superior heat stability than the use of either component alone or in combination with other heat age additives.

SUMMARY OF THE INVENTION

The present invention provides a heat-curable fluorosilicone composition comprising by weight:

(1) a composition prepared by reacting at a temperature in the range of from about 25° C. to about 180° C.:
- (A) from about 94 to about 98 parts of an alkenyl-terminated and silanol-terminated diorganopolysiloxane copolymer having a viscosity of from about 1,000,000 to about 300,000,000 centipoise at 25° C., comprising units of the formulae $RR^1SiO$ and $R^2{}_2SiO$, wherein R is a fluoroalkyl radical, and $R^1$ and $R^2$ are each monovalent hydrocarbon radicals, the $RR^1SiO$ units being present in an amount sufficient to provide a silicon-bonded fluorine content of from about 36 to about 37 weight percent, the ratio of vinyl endgroups to silanol endgroups being from about 65:35 to about 75:25, the alkenyl-on-chain content of the copolymer being from 0% to about 0.6%; the total silicon-bonded alkenyl content of the copolymer being from 0.014 to about 0.020% by weight;
- (B) from about 2.0 to about 6.0 parts of an alkenyl-terminated and silanol-terminated diorganopolysiloxane copolymer having a viscosity of from about 1,000,000 to about 300,000,000 centipoise at 25° C., comprising units of the formulae $RR^1SiO$ and $R^2{}_2SiO$, wherein R is a fluoroalkyl radical, and $R^1$ and $R^2$ are each monovalent hydrocarbon radicals, the $RR^1SiO$ units being present in an amount sufficient to provide a silicon-bonded fluorine content of from about 35.5 to about 36.5 weight percent, the ratio of vinyl endgroups to silanol endgroups being from about 65:35 to about 75:25, the alkenyl-on-chain content of the copolymer being from 1.4% to about 1.6% by weight; the total silicon-bonded alkenyl content of the copolymer being from about 1.45 to about 1.65% by weight; the sum of (A) and (B) being 100 parts; and
- (C) from about 1 to about 10 parts of red iron oxide, wherein the red iron oxide has a purity of at least 96% with at least 90% by weight of the red iron oxide having an average particle size of less than about 1.2 micrometers; and
- (D) from about 0.1 to about 3 parts of cerium hydroxide having an average particle size of from about 40 to about 57 micrometers, the temperature of composition comprising (A), (B), and (C) being maintained at less than 80° C. when the cerium hydroxide (D) is contacted therewith; and (2) a catalytic amount of an organic peroxide catalyst.

The present invention is further directed to a method for increasing the heat stability of a heat cured fluorosilicone composition. In addition to improved heat stability, the heat curable fluorosilicone compositions of this invention have excellent compression, hardness, elongation, and tear resistance properties.

DETAILED DESCRIPTION OF THE INVENTION

According to the present invention, the heat stability of a cured fluorosilicone composition prepared from a curable composition containing components (1)(A), (1)(B), and an organic peroxide curing catalyst is improved without a sacrifice in its physical properties by the addition to (1)(A) and (1)(B) of critical amounts of (C) red iron oxide and (D) cerium hydroxide.

The heat curable fluorosilicone composition of this invention is prepared by reacting at a temperature in the range of from about 25° C. to about 180° C. components (A)–(D), with the proviso that at the time the cerium hydroxide (D) is contacted with (A)–(C), the temperature of the composition be less than 80° C. It has been found that if the temperature of the composition exceeds 80° C. when the cerium hydroxide is added thereto, the effectiveness of the cerium hydroxide as a heat age stabilizing additive in the present invention is significantly impaired. Such a temperature restriction does not apply to the addition of the red iron oxide.

The amount of red iron oxide (C) added to the fluorosilicone composition is in the range of from about 1 to about 10, preferably from about 1 to about 6, and most preferably from about 1 to about 3, parts by weight per 100 parts of (A) and (B).

The amount of cerium hydroxide (D) added to the fluorosilicone composition is in the range of from about 0.1 to about 3, preferably from about 0.5 to about 1.5, and most preferably from about 0.5 to about 1.0, parts by weight per 100 parts of (A) and (B).

The cerium hydroxide and the red iron oxide must be added in the amounts recited above in order to provide the fluorosilicone composition with both improved heat stability as well as excellent physical properties.

It is to be understood that the red iron oxide (C) and the cerium hydroxide (D) may be added to the fluorosilicone composition separately or as a preblended mixture. Typically, they are added separately. In addition, components (A)–(D) may be added together at the same time.

The base polymer (Component (A)) used in the method and composition of this invention is an alkenyl-terminated and silanol-terminated diorganopolysiloxane copolymer comprising units of the formulae $RR^1SiO$ and $R^2_2SiO$, wherein R is a fluoroalkyl radical, and $R^1$ and $R^2$ are each monovalent hydrocarbon radicals.

In (A), R, $R^1$, and $R^2$ are each preferably a fluoroalkyl radical containing 3 or more, preferably 3 to 8, carbon atoms, and 1 or more, preferably 1 to 3, fluorine atoms. Examples of such radicals include 3-fluoropropyl; 3,3-difluoropropyl; and 3,3,3-trifluoropropyl. Most preferably, R is a substituted alkyl group such as —$CH_2CH_2R^3$, wherein $R^3$ is perfluoroalkyl containing from 1 to 6 carbon atoms, such as perfluoromethyl, perfluoroethyl, perfluorohexyl, and the like. Most preferably, the R radical is 3,3,3-trifluoropropyl. The $R^1$ and $R^2$ radicals are each preferably methyl.

The vinyl polymer (A) has a viscosity of from about 1,000,000 to about 300,000,000, preferably from about 170,000,000 to about 230,000,000, and most preferably from about 180,000,000 to about 210,000,000, centipoise at 25° C.

In (A), the $RR^1SiO$ units are present in an amount sufficient to provide a silicon-bonded fluorine content of from about 36% to about 37% by weight, preferably from about 36.5 to about 37, and most preferably from about 36.8 to about 37 weight percent. The ratio of alkenyl endgroups to silanol endgroups is from about 65:35 to about 75:25, preferably from about 70:30 to about 75:25, and most preferably from about 72:28 to about 75:25. The alkenyl-on-chain content of the copolymer (A) is from 0% to about 0.6%, preferably from about 0 to about 0.2%, and most preferably is 0%, by weight. The total silicon-bonded alkenyl content of the copolymer is from about 0.014 to about 0.020, preferably from about 0.015 to about 0.019, and most preferably from about 0.016 to about 0.018 % by weight.

The base polymer (A) can be prepared by reacting a cyclotrisiloxane containing organo and fluoroalkyl substituent groups, a vinyl-terminated sodium fluorosilanolate, and a chainstopper which is a mixture containing a vinyl-terminated fluorosilicone and silanol-terminated fluorosilicone. The cyclotrisiloxane and the chainstopper are mixed and then heated to a temperature of from about 135° –140° C., after which the fluorosilanolate is added to the reaction mixture. The mixture is then held, with agitation, at a temperature in the range of 135° –140° C. for about 4.0 to about 4.5 hours. After the reaction is over, the polymer mixture is neutralized with a silyl phosphate and the cyclics are stripped off. The final product is then extruded through a screen pack having a sieve size of about 150 mesh to remove extraneous materials such as dirt and particulates.

The cyclotrisiloxane used in preparing (A) is preferably a 1,3,5-tris(trifluoropropyl)-1,3,5-trimethylcyclotrisiloxane. Such compounds can be prepared from a cracking process using a trifluoropropylmethylsiloxane hydrolyzate derived from the aqueous hydrolysis of the corresponding pure dichlorosilane, i.e., methyl-3,3,3-trifluoropropyldichlorosilane. The amount of aliphatic unsaturation in the cyclotrisiloxane varies from about 0 to about 1.0, preferably from about 0 to about 0.6, and most preferably is 0, weight percent in the total cyclotrisiloxane reactant.

The vinyl-terminated sodium fluorosilanolate used in making (A) is a low molecular weight telomeric fluid containing both sodium silanolate and vinyldimethylsiloxy endgroups. This fluid functions as catalyst for the polymerization of the cyclotrisiloxane to fluorosilicone homopolymers and fluids. It is prepared through the base-catalyzed ring opening of fluorosilicone cyclic trimer in the presence of appropriate chain modifiers, e.g., divinyltetramethylsiloxane, and excess aqueous sodium hydroxide. The base is a 4% solution of previously prepared fluorosilanolate. The base is added to the cyclic trimer and chain modifiers while at 35° –45° C. over a period of about one hour or the appearance of oiling. The aqueous base is then added over a controlled rate and the reaction is heated to a maximum of 120° C. Nitrogen is used initially as a blanket but is then reverted to a sparge to facilitate the removal of water during the stripping operation.

The chain modifier used in making the base polymer (A) can be a mixture containing 100 parts by weight of a vinyl-terminated fluorosilicone polydimethylsiloxane copolymer and from about 2.0 to about 5.0 parts by weight of a silanol-terminated fluorosilicone. The vinyl-terminated fluorosilicone polydimethylsilicone copolymer has a fluorosilicone content of 30–60 mole percent. This copolymer and a method for preparing it is disclosed in U.S. Pat. No. 4,348,531 (Evans) which is hereby incorporated by reference herein. The silanol-terminated fluorosilicone preferably has the formula

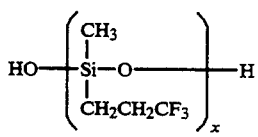

wherein x is preferably 3. It is typically prepared by the acid-catalyzed ring opening of a cyclic trimer of trifluoropropyl-methylsiloxane.

Component (B) used in the method and composition of this invention functions as a crosslinker. It is an alkenyl-terminated and silanol-terminated diorganopolysiloxane copolymer comprising units of the formulae $RR^1SiO$ and $R^2_2SiO$, wherein R, $R^1$ and $R^2$ are as previously defined herein.

The preferences for the radicals represented by R, $R^1$, and $R^2$ in vinyl polymer (B) are the same as those for the base polymer (A).

The vinyl polymer (B) has a viscosity of from about 1,000,000 to about 300,000,000, preferably from about 170,000,000 to about 230,000,000, and most preferably from about 190,000,000 to about 210,000,000, centipoises at 25° C.

In (B), the $RR^1SiO$ units are present in an amount sufficient to provide a silicon-bonded fluorine content of from about 34.0 to about 36.5, preferably from about 34.5 to about 36.0, and most preferably from about 35.0 to about 36.0 weight percent. The ratio of alkenyl endgroups to silanol endgroups is from about 65:35 to about 75:25, preferably from about 68:32 to about 75:25, and most preferably from about 70:30 to about 75:25. The alkenyl-on-chain content of the copolymer (B) is from 1.2% to about 1.6%, preferably from about 1.4% to about 1.6%, and most preferably from about 1.45% to about 1.6%, by weight. The total silicon-bonded alkenyl content of the copolymer is from about 1.22 to about 1.62, preferably from about 1.45 to about 1.62, and most preferably from about 1.5 to about 1.65% by weight.

The vinyl polymer (B) can be prepared by reacting a cyclotrisiloxane containing organo and fluoroalkyl substituent groups, a vinyl-terminated sodium fluorosilanolate, a methylvinylcyclic trimer, and a vinyl-terminated fluorosilicone polydimethylsiloxane copolymer chainstopper. The cyclotrisiloxane is heated to a temperature of from about 130°–135° C., after which the chain modifier, fluorosilanolate and methylvinylcyclic trimer are added to the cyclotrisiloxane. The mixture is then held, with agitation, at a temperature in the range of 135°–140° C. for about 4 to about 4.5 hours. After the reaction is over, the polymer mixture is neutralized with a silyl phosphate and the cyclics are stripped off. The final product is then extruded through a screen pack having a sieve size of about 150 mesh to remove extraneous materials such as dirt and particulates.

The cyclotrisiloxane and vinyl-terminated sodium fluorosilanolate used for making (B) can be the same as those used for making (A).

The vinyl-terminated fluorosilicone polydimethylsiloxane copolymer chain modifier used in the preparation of (B) contains a fluorosilicone content of about 40 to about 60 mole percent. It is prepared by the polymerization of a methyl-3,3,3-trifluoropropylmethylsiloxane cyclic trimer with octamethylcyclotetrasiloxane in the presence of a vinyl-type chainstopper.

In the method and composition of this invention, the total of (A) and (B) is 100 parts by weight. The amount of (A) is within the range of from about 94 to about 98, preferably from about 95 to about 98, and most preferably from about 95 to about 97 parts by weight. The amount of (B) is within the range of from about 2 to about 6, preferably from about 2 to about 5, and most preferably from about 3 to about 5.

Component (C) is red iron oxide having a purity (i.e., $Fe_2O_3$ content) of at least 96%, preferably from about 97% to about 100%, and most preferably about 100 %. The impurities in the red iron oxide are such materials as calcium oxide and sulfur. At least 90%, preferably from about 91% to about 96%, and most preferably from about 92% to about 96% of the red iron oxide has an average particle size of less than about 1.2 micrometers, and preferably from about 0.9 to about 1.3, and most preferably from about 0.9 to about 1.2, micrometers.

Red iron oxide is a known compound and is commercially available.

The red iron oxide is preferably employed herein as a dispersion in a polydiorganosiloxane fluid, the dispersion typically having a solids content of about 65% by weight.

Component (D) is cerium hydroxide, having an average particle size of from about 40 to about 57, preferably from about 40 to about 52, and most preferably from about 40 to about 44, micrometers. The particle size of the cerium hydroxide is important because if the particle size is too large, aggregates of cerium hydroxide will form which causes specks or streaks in the cured composition which reduces both the aesthetic value and the heat resistance of the cured product.

Preferably, the cerium hydroxide is used as a dispersion in a polydiorganosiloxane fluid, the dispersion typically having a solids content of about 75% by weight.

The curing of the fluorosilicone rubber composition of the present invention can be effected by chemical vulcanizing agents or by high energy electron radiation. More often, chemical vulcanizing agents are used for the curing operation and any of the conventional curing agents can be used. The preferred curing agents are organic peroxides conventionally used to cure silicone elastomers.

Thus, part (2) of the curable fluorosilicone composition of this invention is an organic peroxide curing catalyst.

The most suitable peroxide catalysts are compounds of the formula, AOOH or AOOA, in which A is an organic radical, especially those compounds in which at least one peroxide oxygen is attached to a tertiary carbon atom. Preferred peroxide catalysts include, for example, t-butyl hydroperoxide, cumene hydroperoxide, decaline hydroperoxide, di-t-butyl peroxide, dicumyl peroxide, and 2,5-dimethyl-2,5-di-(t-butyl peroxy)-hexane. The peroxides containing tertiary alkoxy radicals are more efficient in abstracting hydrogen or halogen atoms from the pendant organic groups linked to the silicon atoms, and are therefore preferred. The most preferred of these is 2,5-dimethyl-2,5-di-(t-butyl peroxy)hexane, which is available commercially, e.g., at 45% by weight on an inert filler under the tradenames, VAROX ® (R. T. Vanderbilt Co., Inc.) and LUPERCO ® 101XL (Lucidol Division, Pennwalt Corp.)

The catalyst (2) is used in a catalytic amount which is typically from about 0.8 to about 2.0, preferably from about 0.9 to about 1.5, and most preferably from about 1.0 to about 1.2, parts by weight per 100 parts of (A) and (B).

The composition of this invention may further comprise (E) filler, e.g., reinforcing filler, such as fumed silica or precipitated silica; and/or extending fillers, such as zinc oxide, titanium oxide, diatomaceous earth, and the like. A particularly useful filler for the composition and method herein is a silica filler, preferably fumed silica.

The composition of this invention may further contain flame retardants, e.g., platinum (as platinum or in combination with other materials such as triallylisocyanurate); adhesion promoters, such as organic silazanes, which promote bonding between fillers and the gum; and other additives, including anti-oxidants, processing aids (e.g., silanol fluids) supplemental curing agents (e.g., materials that provide additional vinyl curing sites) such as trimethylol propane trimethacrylate (Sartomer ® 350; Sartomer Co.), triallyl trimellitate (Sipomer ® TATM; Alcolac, Inc.), 1,3,5-trimethyl-1,3,-trivinylcyclotetrasiloxane; 1,3,5,7-tetramethyl-1,3,5,7-tetravinylcyclotetrasiloxane, and the like.

The heat curable composition of this invention containing part (1) and part (2) may be cured at elevated temperatures, for example, from about 100° C. to about 300° C., or by exposure to radiation, to produce fluorosilicone elastomers having the aforementioned physical properties.

In order that those skilled in the art will be better able to practice the present invention, the following examples are given by way of illustration and not by way of limitation. All parts and percentages are by weight, unless otherwise noted.

EXPERIMENTAL

EXAMPLE 1

The fluorosilicone heat cured rubber compound was prepared in a dough mixer by adding 98 parts of a vinyl terminated high molecular weight polymer (having a Williams' Plasticity of approximately 200) and 2.0 parts of a vinyl terminated fluorosilicone-vinylmethylsiloxy copolymer, having approximately 1.2–1.4 weight percent vinyl-on-chain. After mixing for 30 minutes, 6.0 parts of a disilanol terminated fluorosilicone telomeric fluid and 0.51 parts of a 1,3-divinyltetramethyldisilazone was added and the mixture sheared for 15 minutes. 2.0 parts of an alkoxy terminated dimethylsiloxy-diphenylsiloxy process aide and 0.5 parts of a vinyl terminated polydimethylsiloxane process aide was added and the mixture was sheared for 15 minutes. 42 parts of fumed silica, having a surface area of approximately 200 +/−25 m²/gram was added in three increments. 2.0 parts of the disilanol terminated fluorosilicone telomeric fluid was added and the mixture sheared for one hour under a blanket of nitrogen. The vessel was then heated to 180° C. for three hours to reduce the volatiles down to <1.2 weight present. The batch was cooled down to <80° C. and 0.33 parts of trimethylolpropane trimethacrylate was added and the batch sheared for 30 minutes and then strained through a 150 mesh screen pack.

Example 1 illustrates the preparation of a heat curable fluorosilicone composition used as the base composition (i.e., composition which does not contain a heat age additive) in Examples 2–8 below.

EXAMPLES 2–8

Seven heat cured compositions were prepared according to the procedure described in Example 1 above. The compositions were compounded with the organic peroxide curing agent, Varox ® 45% 2,5-dimethyl-2,5-di(t-butylperoxy)hexane on inert fillers (R. T. Vanderbilt, Inc.), the amount of catalyst used being 1.5 parts per 100 parts of the base composition prepared in Example 1 above. Each composition was also compounded with a different heat additive as shown in Table 1 below. The compositions were then press cured 15 minutes at 350° C and post baked 4 hours at 400° C.

Examples 2, 3, 4, and 8 are control examples while Examples 5, 6, and 7 are within the scope of this invention.

TABLE 1

| Examples 2–8; Heat Age Additives | | | | |
|---|---|---|---|---|
| | Heat Age Additive (parts by weight) | | | |
| Example No. | Fumed TiO | Iron Octoate | Cerium Hydroxide | Red Iron Oxide |
| 2 | 0 | 0 | 0.7 | 0 |
| 3 | 2.0 | 0.2 | 0.7 | 0 |
| 4 | 2.0 | 0.2 | 0.7 | 2.0 |
| 5 | 0 | 0 | 0.7 | 2.0 |
| 6 | 0 | 0 | 0.7 | 3.0 |
| 7 | 0 | 0 | 0.7 | 6.0 |
| 8 | 0 | 0 | 0 | 3.0 |

The physical properties of the compositions prepared in Examples 2–8 are presented in Table 2 below:

TABLE 2

| | Examples 2–8; Physical Properties | | | | | | |
|---|---|---|---|---|---|---|---|
| | Example No. | | | | | | |
| Property | 2 | 3 | 4 | 5 | 6 | 7 | 8 |
| Shore A | 62 | 63 | 62 | 60 | 60 | 58 | 60 |
| 100% modulus | 320 | 310 | 310 | 320 | 320 | 307 | 415 |
| Tensile (psi) | 1350 | 1310 | 1260 | 1386 | 1335 | 1340 | 1285 |
| Elongation (%) | 345 | 360 | 356 | 352 | 332 | 336 | 305 |
| Die B Tear, (lbs/inch) | 205 | 215 | 226 | 208 | 198 | 209 | 152 |
| Specific Gravity | 1.461 | 1.484 | 1.494 | 1.471 | 1.483 | 1.497 | 1.492 |
| Comp. Set 22 hrs/350° F., (%) | 7.9 | — | 21.6 | 7.2 | 7.0 | 8.2 | 11.9 |
| Weight Loss | 3.4 | 3.4 | 3.4 | 3.3 | 3.3 | 3.3 | 3.3 |

EXAMPLES 9–15

Examples 2–8 were repeated and the compositions heat aged at 500° C. for 22 hours. The physical properties of the resulting compositions are presented in Table 3 below. In Table 3, the amounts in parentheses represents the amount of change, with the plus sign indicating the increase in amount and the minus sign indicating the decrease in amount.

TABLE 3

| | Examples 9–15; Physical Properties After Heat Aged 22 Hours at 500° C. | | | | | | |
|---|---|---|---|---|---|---|---|
| | Example No. | | | | | | |
| Property | 9 | 10 | 11 | 12 | 13 | 14 | 15 |
| Shore A | 62 (0) | 66 (+3) | 65 (+3) | 62 (+2) | 60 (0) | 61 (+3) | 61 (+1) |
| Tensile (psi) | 667 | 501 | 514 | 817 | 683 | 796 | 784 |

TABLE 3-continued

| | Examples 9–15; Physical Properties After Heat Aged 22 Hours at 500° C. | | | | | | |
|---|---|---|---|---|---|---|---|
| | Example No. | | | | | | |
| Property | 9 | 10 | 11 | 12 | 13 | 14 | 15 |
| Elongation (%) | (−50.5%) 240 (−30.2%) | (−61.7%) 162 (−54.8%) | (59.2%) 168 (−52.8%) | (−41.1) 277 (−21.3) | (−48.8) 280 (−15.6) | (−40.6) 293 (−12.8) | (−39.0%) 239 (−21.6%) |

EXAMPLES 16–22

Examples 2–8 were repeated and the compositions heat aged at 400° C. for 70 hours. The physical properties of the resulting compositions are presented in Table 4 below. In Table 4, the amounts in parentheses represents the amount of change, with the plus sign indicating the increase in amount and the minus sign indicating the decrease in amount.

TABLE 4

| | Examples 16–22; Physical Properties After Heat Aged 70 Hours at 400° C. | | | | | | |
|---|---|---|---|---|---|---|---|
| | Example No. | | | | | | |
| Property | 16 | 17 | 18 | 19 | 20 | 21 | 22 |
| Shore A | 64 (+2) | 67 (+4) | 66 (+4) | 63 (+3) | 61 (+1) | 61 (+3) | 63 (+3) |
| Tensile (psi) | 1222 (−9.3%) | 1118 (−14.6%) | 932 (−26.1%) | 1264 (−8.8%) | 1229 (−7.8%) | 1340 (0%) | 1066 (−17.0%) |
| Elongation (%) | 298 (−13.3%) | 273 (−23.9%) | 268 (−24.7%) | 332 (−5.7%) | 332 (−0%) | 357 (+6.3%) | 270 (−11.1%) |

EXAMPLES 23–29

Examples 2–8 were repeated and the compositions heat aged at 500° C. for 70 hours. The physical properties of the resulting compositions are presented in Table 5 below. In Table 5, the amounts in parentheses represents the amount of change, with the plus sign indicating the increase in amount and the minus sign indicating the decrease in amount.

TABLE 5

| | Examples 23–29; Physical Properties After Heat Aged 70 Hours at 500° C. | | | | | | |
|---|---|---|---|---|---|---|---|
| | Example No. | | | | | | |
| Property | 23 | 24 | 25 | 26 | 27 | 28 | 29 |
| Shore A | 63 (+1) | 69.6 (+6) | 69 (+7) | 65 (+5) | 63 (+3) | 64 (+6) | 62 (+2) |
| Tensile | 467 (−65.3%) | 293 (−77%) | 309 (−75%) | 597 (−56.9%) | 483 (−63.8%) | 512 (−61.8%) | 523 (−57.8%) |
| Elongation | 148 (−56.9%) | 56 (−84%) | 67 (−81%) | 191 (−45.7%) | 185 (−44.3%) | 192 (−42.8%) | 130 (−57.3%) |

What is claimed is:

1. A heat-curable fluorosilicone composition comprising by weight:
   (1) a composition prepared by reacting at a temperature in the range of from about 25° C. to about 180° C.:
      (A) from about 94 to about 98 parts of an alkenyl-terminated and silanol-terminated diorganopolysiloxane copolymer having a viscosity of from about 1,000,000 to about 300,000,000 centipoise at 25° C., comprising units of the formulae $RR^1SiO$ and $R^2_2SiO$, wherein R is a fluoroalkyl radical, and $R^1$ and $R^2$ are each monovalent hydrocarbon radicals, the $RR^1SiO$ units being present in an amount sufficient to provide a silicon-bonded fluorine content of from about 36 to about 37 weight percent, the ratio of vinyl endgroups to silanol endgroups being from about 65:35 to about 75:25, the alkenyl-on-chain content of the copolymer being from 0% to about 0.6%; the total silicon-bonded alkenyl content of the copolymer being from 0.014 to about 0.020% by weight;
      (B) from about 2.0 to about 6.0 parts of an alkenyl-terminated and silanol-terminated diorganopolysiloxane copolymer having a viscosity of from about 1,000,000 to about 300,000,000 centipoise at 25° C., comprising units of the formulae $RR^1SiO$ and $R^2_2SiO$, wherein R is a fluoroalkyl radical, and $R^1$ and $R^2$ are each monovalent hydrocarbon radicals, the $RR^1SiO$ units being present in an amount sufficient to provide a silicon-bonded fluorine content of from about 35.5 to about 36.5 weight percent, the ratio of vinyl endgroups to silanol endgroups being from about 65:35 to about 75:25, the alkenyl-on-chain content of the copolymer being from 1.4% to about 1.6% by weight; the total silicon-bonded alkenyl content of the copolymer being from about 1.45 to about 1.65% by weight; the sum of (A) and (B) being 100 parts; and
      (C) from about 1 to about 10 parts of red iron oxide, wherein the red iron oxide has a purity of at least 96% with at least 90% by weight of the red iron oxide having an average particle size of less than about 1.2 micrometers; and
      (D) from about 0.1 to about 3 parts of cerium hydroxide having an average particle size of from about 40 to about 57 micrometers, the temperature of the composition comprising (A), (B), and (C) being maintained at less than 80° C. when the cerium hydroxide (D) is contacted therewith; and
   (2) a catalytic amount of an organic peroxide catalyst.

2. A composition according to claim 1 wherein the red iron oxide (C) is used in an amount within the range of 1 to about 6 parts by weight.

3. A composition according to claim 2 wherein the red iron oxide (C) is used in an amount within the range of 1 to about 3 parts by weight.

4. A composition according to claim 1 wherein the cerium hydroxide (D) is used in an amount within the range of 0.5 to about 1.5 parts by weight.

5. A composition according to claim 4 wherein the cerium hydroxide (D) is used in an amount within the range of 0.5 to about 1.0 part by weight.

6. A composition according to claim 1 wherein the cerium hydroxide (D) has an average particle size of from about 40 to about 52 micrometers.

7. A composition according to claim 6 wherein the cerium hydroxide (D) has a particle size of from about 40 to about 44 micrometers.

8. A composition according to claim 1 wherein the red iron oxide is 100% pure $Fe_2O_3$.

9. A composition according to claim 1 wherein at least 90% of the red iron oxide has an average particle size of from about 0.9 to about 1.2 micrometers.

10. A composition according to claim 9 wherein from about 91% to about 96% of the red iron oxide has an average particle size of from about 0.9 to about 1.2 micrometers.

11. A composition according to claim 1 wherein the organic peroxide curing catalyst (2) is present in an amount within the range of from about 0.8 to about 2.0 parts by weight.

12. A composition prepared by reacting at a temperature in the range of from about 25° C. to about 180° C.:
   (A) from about 94 to about 98 parts of an alkenyl-terminated and silanol-terminated diorganopolysiloxane copolymer having a viscosity of from about 1,000,000 to about 300,000,000 centipoise at 25° C., comprising units of the formulae $RR^1SiO$ and $R^2{}_2SiO$, wherein R is a fluoroalkyl radical, and $R^1$ and $R^2$ are each monovalent hydrocarbon radicals, the $RR^1SiO$ units being present in an amount sufficient to provide a silicon-bonded fluorine content of from about 36 to about 37 weight percent, the ratio of vinyl endgroups to silanol endgroups being from about 65:35 to about 75:25, the alkenyl-on-chain content of the copolymer being from 0% to about 0.6%; the total silicon-bonded alkenyl content of the copolymer being from 0.014 to about 0.020% by weight;
   (B) from about 2.0 to about 6.0 parts of an alkenyl-terminated and silanol-terminated diorganopolysiloxane copolymer having a viscosity of from about 1,000,000 to about 300,000,000 centipoise at 25° C., comprising units of the formulae $RR^1SiO$ and $R^2{}_2SiO$, wherein R is a fluoroalkyl radical, and $R^1$ and $R^2$ are each monovalent hydrocarbon radicals, the $RR^1SiO$ units being present in an amount sufficient to provide a silicon-bonded fluorine content of from about 35.5 to about 36.5 weight percent, the ratio of vinyl endgroups to silanol endgroups being from about 65:35 to about 75:25, the alkenyl-on-chain content of the copolymer being from 1.4% to about 1.6% by weight; the total silicon-bonded alkenyl content of the copolymer being from about 1.45 to about 1.65% by weight; the sum of (A) and (B) being 100 parts;
   (C) from about 1 to about 10 parts of red iron oxide, wherein the red iron oxide has a purity of at least 96% with at least 90% by weight of the red iron oxide having an average particle size of less than about 1.2 micrometers; and
   (D) from about 0.1 to about 3 parts of cerium hydroxide having an average particle size of from about 40 to about 57 micrometers, the temperature of the composition comprising (A), (B), and (C) being maintained at less than 80° C. when the cerium hydroxide (D) is contacted therewith.

13. A method for increasing the heat stability of a cured fluorosilicone composition prepared by curing a composition comprising:
   (1) a composition prepared by reacting at a temperature in the range of from about 25° C. to about 180° C.:
      (A) from about 94 to about 98 parts of an alkenyl-terminated and silanol-terminated diorganopolysiloxane copolymer having a viscosity of from about 1,000,000 to about 300,000,000 centipoise at 25° C., comprising units of the formulae $RR^1SiO$ and $R^2{}_2SiO$, wherein R is a fluoroalkyl radical, and $R^1$ and $R^2$ are each monovalent hydrocarbon radicals, the $RR^1SiO$ units being present in an amount sufficient to provide a silicon-bonded fluorine content of from about 36 to about 37 weight percent, the ratio of vinyl endgroups to silanol endgroups being from about 65:35 to about 75:25, the alkenyl-on-chain content of the copolymer being from 0% to about 0.6%; the total silicon-bonded alkenyl content of the copolymer being from 0.014 to about 0.020% by weight;
      (B) from about 2.0 to about 6.0 parts of an alkenyl-terminated and silanol-terminated diorganopolysiloxane copolymer having a viscosity of from about 1,000,000 to about 300,000,000 centipoise at 25° C., comprising units of the formulae $RR^1SiO$ and $R^2{}_2SiO$, wherein R is a fluoroalkyl radical, and $R^1$ and $R^2$ are each monovalent hydrocarbon radicals, the $RR^1SiO$ units being present in an amount sufficient to provide a silicon-bonded fluorine content of from about 35.5 to about 36.5 weight percent, the ratio of vinyl endgroups to silanol endgroups being from about 65:35 to about 75:25, the alkenyl-on-chain content of the copolymer being from 1.4% to about 1.6% by weight; the total silicon-bonded alkenyl content of the copolymer being from about 1.45 to about 1.65% by weight; the sum of (A) and (B) being 100 parts; and
   (2) a catalytic amount of an organic peroxide curing catalyst; comprising the step of reacting at a temperature in the range of from about 25° C. to about 180° C. components (1)(A) and (1)(B) with:
      (C) from about 1 to about 10 parts of red iron oxide, wherein the red iron oxide has a purity of at least 96% with at least 90% by weight of the red iron oxide having an average particle size of less than about 1.2 micrometers; and
      (D) from about 0.1 to about 3 parts of cerium hydroxide having an average particle size of from about 40 to about 57 micrometers, the temperature of composition comprising (A), (B), and (C) being maintained at less than 80° C. when the cerium hydroxide (D) is contacted therewith.

14. The cured fluorosilicone composition of claim 1.

15. An article comprising the cured fluorosilicone composition of claim 1.

* * * * *